United States Patent
Menissez et al.

(10) Patent No.: US 10,195,701 B2
(45) Date of Patent: Feb. 5, 2019

(54) SEAL PLACEMENT DEVICE

(71) Applicant: NORETUD INDUSTRIES, Feignies (FR)

(72) Inventors: Gregory Menissez, Villereau (FR); Remi Durieu, Elesmes (FR)

(73) Assignee: NORETUD INDUSTIES, Feignies (FR)

( * ) Notice: Subject to any disclaimer, the term of this patent is extended or adjusted under 35 U.S.C. 154(b) by 245 days.

(21) Appl. No.: 15/123,883

(22) PCT Filed: Mar. 3, 2014

(86) PCT No.: PCT/FR2014/050456
§ 371 (c)(1),
(2) Date: Sep. 6, 2016

(87) PCT Pub. No.: WO2015/132474
PCT Pub. Date: Sep. 11, 2015

(65) Prior Publication Data
US 2017/0014960 A1    Jan. 19, 2017

(51) Int. Cl.
  *B23P 19/04* (2006.01)
  *B25D 9/06* (2006.01)
  (Continued)

(52) U.S. Cl.
  CPC ........ *B23P 19/047* (2013.01); *B25B 27/0028* (2013.01); *B25B 31/00* (2013.01);
  (Continued)

(58) Field of Classification Search
  CPC ..... B23P 19/027; B23P 19/033; B23P 19/047; B25B 27/0028; B25B 27/0092;
  (Continued)

(56) References Cited

U.S. PATENT DOCUMENTS 3,896,897 A * 7/1975 Hilbush, Jr. ........... B25D 17/12
                                                                                  181/230
4,624,339 A * 11/1986 Marcel ................... B25D 17/00
                                                                                  173/DIG. 2

(Continued)

FOREIGN PATENT DOCUMENTS

DE   10 2007 042 721 A1   3/2009
EP        0 656 465 A2   6/1995
(Continued)

OTHER PUBLICATIONS

International Search Report, dated Nov. 26, 2014, from corresponding PCT Application.

*Primary Examiner* — Matthew P Travers
(74) *Attorney, Agent, or Firm* — Young & Thompson

(57) ABSTRACT

A device (100) for placing a seal (J) on a mounting (S) including a vibration generator (10), that includes: a main body (11); a distal portion (12), movable relative to the main body, onto which a cap (13) having a contact surface (13a) for engaging with the seal is attached; and drive elements (14), configured to drive the distal portion in reciprocal translation relative to the main body, such as to place the seal on the mounting when the contact surface (13a) of the cap (13) engages with the seal (J) that is placed on the mounting (S). The device includes: a grasping handle (20), connected to the main body; and resilient connection elements (30a, 30b) that are located between the main body and the grasping handle and are configured such as to limit the propagation, in the grasping handle, of the vibrations generated by the reciprocal translation movement.

18 Claims, 2 Drawing Sheets

Figure 1:
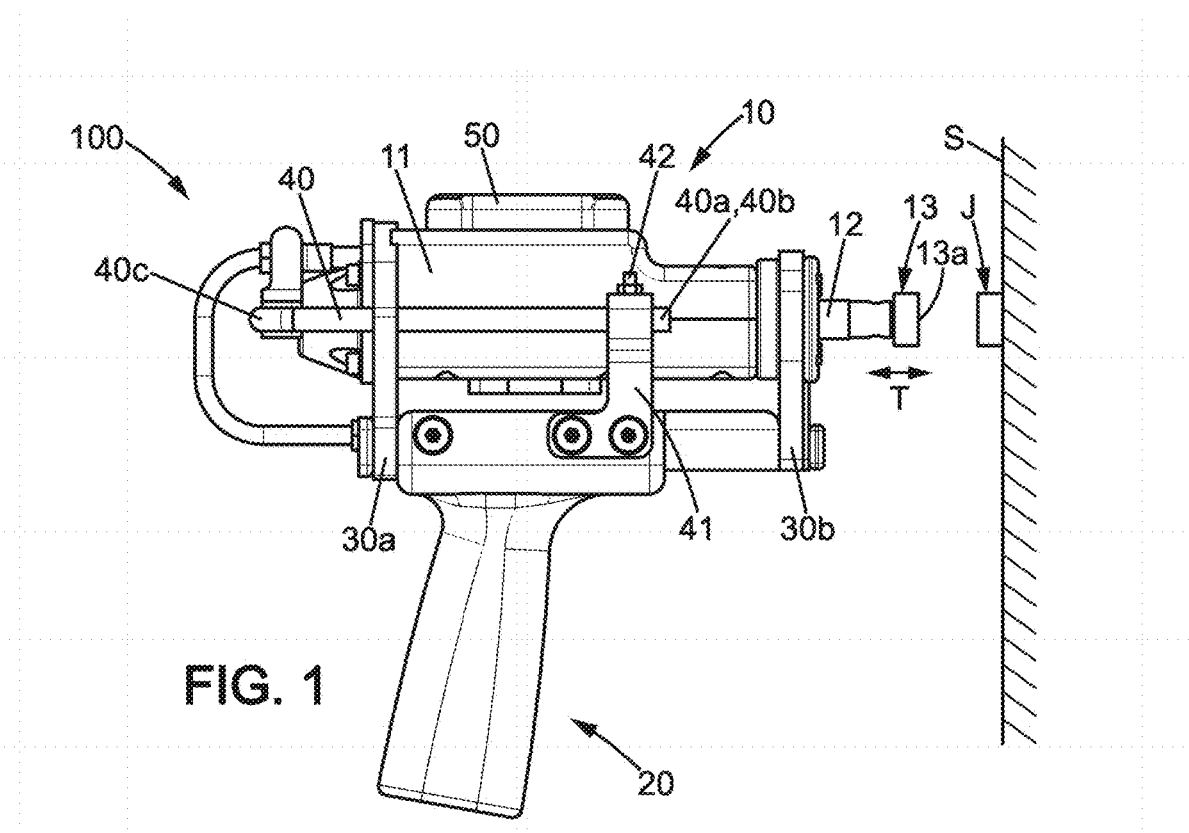

(51) Int. Cl.
*B25B 31/00* (2006.01)
*B25B 27/00* (2006.01)
*B25D 17/24* (2006.01)
*B25D 9/08* (2006.01)
*B25D 17/12* (2006.01)
*B25D 17/06* (2006.01)
*B25D 17/04* (2006.01)

(52) U.S. Cl.
CPC .............. *B25D 9/06* (2013.01); *B25D 9/08* (2013.01); *B25D 17/043* (2013.01); *B25D 17/06* (2013.01); *B25D 17/12* (2013.01); *B25D 17/24* (2013.01); B25D 2217/0019 (2013.01); B25D 2217/0073 (2013.01); B25D 2222/57 (2013.01); B25D 2222/69 (2013.01); B25D 2250/245 (2013.01); B25D 2250/295 (2013.01)

(58) Field of Classification Search
CPC ... B25B 25/00; B25B 27/0035; B25D 17/043; B25D 17/24; B25D 2217/0073; B25D 17/12; B25G 1/01; F16F 7/00; F16F 15/04; F16F 15/046; F16F 15/08; F16F 2224/025
See application file for complete search history.

(56) References Cited

U.S. PATENT DOCUMENTS

| | | | |
|---|---|---|---|
| 5,157,807 A | 10/1992 | Keller et al. | |
| 5,408,902 A * | 4/1995 | Burnett | B25D 1/12 30/308.1 |
| 5,418,339 A | 5/1995 | Bowen et al. | |
| 5,657,674 A * | 8/1997 | Burnett | B25D 1/12 81/20 |
| 8,205,683 B2 * | 6/2012 | Schadow | B24B 23/04 173/162.1 |
| 2010/0224068 A1 | 9/2010 | Yu et al. | |

FOREIGN PATENT DOCUMENTS

| | | |
|---|---|---|
| FR | 2 849 617 A1 | 7/2004 |
| GB | 2 297 514 A | 8/1996 |
| JP | 2007-261356 A1 | 10/2007 |

* cited by examiner

SEAL PLACEMENT DEVICE

TECHNICAL FIELD

The object of this invention relates to the field of tooling for placing seals.

This invention aims in particular to facilitate the work of operators during the placing of a seal on a mounting such as for example a door of a motor vehicle.

The object of this invention as such has many advantageous applications, in particular in the field of the automobile industry by allowing for the placing of seals on the doors of automobile vehicles.

Of course, other advantageous applications can also be considered in the scope of this invention.

By seal in terms of this invention, it must be understood throughout the description that follows a device that ensures the seal by preventing the leakage of fluids, such as for example a liquid or a gas, with a fixed or movable connector. Generally, a seal is comprised at least partially in a material of the type for example of rubber, elastomer, or polymer, able to resist the differences in pressure and/or temperature of the fluid, as well as its chemical composition.

PRIOR ART

Placing a seal requires that the latter be slightly compressed on the mounting, for example using a mallet; this resilient deformation of the seal provides the seal of the contact.

On the assembly lines of the automobile industry, the work of operators is by nature repetitive; in an industrial context, placing a seal on a vehicle door using a simple mallet cannot be considered.

There are several approaches in prior art for placing such a seal on an automobile vehicle door.

In particular a vibrating pneumatic tool is known that makes it possible to put into movement a file of which the course of travel is about 9 millimeters and which has a frequency of about 40 Hertz.

This type of tool is not ergonomic and does not perform well enough to be used on the assembly lines in the automobile industry.

Document FR 2 849 617 is also known which proposes a device for placing a seal on a mounting.

Such a device according to document FR 2 849 617 comprises a vibration generator comprising (see FIG. 1 of document FR 2 849 617):
a main body,
a distal portion, movable relative to the main body, onto which a cap having a contact surface for engaging with the seal is attached, and
pneumatic drive means configured to drive the distal portion in a reciprocal translation movement relative to the main body for placing the seal on the mounting, when the surface of the cap engages with the seal that is placed on the mounting.

This device as such consists of a vibrating pneumatic tool for putting into movement a cap of which the course of travel is between 0.5 to 6 millimeters, and of which the frequency is between about 60 to 150 Hertz.

This tool no longer meets the new standards and regulations relative to noise pollution and to noises linked to the vibrations, for the automobile industry.

These standards and regulations primarily aim to protect the operators.

Indeed, with a tool such as the one disclosed in document FR 2 849 617, the movement of the distal portion relative to the main body generates noise and parasite vibrations parasites.

In addition, the grasping of this tool is done directly via the main body, which makes the tool difficult to handle.

As such, the operator who holds this tool in his hands feels many vibrations; and the noises that he perceives are sometimes difficult to support, in particular after a day of work.

The Applicant submits that today there is no effective solution that proposes a tool that is ergonomic, easy to handle and practical to use that allows for the placing of a seal, while still reducing the vibrations and the noise.

OBJECT AND SUMMARY OF THIS INVENTION

This invention aims to improve the situation described hereinabove.

More particularly, this invention has for purpose in particular to filter the parasite vibrations that are generated by a tool such as the one described in document FR 2 849 617.

This invention also has for purpose to decrease the sound level of such a tool, as well as to facilitate the use thereof.

To this effect, this invention relates to a device for placing a seal on a mounting. It is understood here that the seal is simply placed on the mounting, and that for the placing, this seal must be compressed (or pressed) against the mounting.

According to this invention, the device comprises a vibration generator that comprises:
a main body (more preferably is a rigid material such as metal),
a distal portion, movable relative to the main body, onto which a cap having a contact surface for engaging with the seal is attached, and
drive means configured to drive the distal portion in a reciprocal translation movement relative to the main body for the placing of the seal on the mounting, when the surface of the cap engages with the seal that is placed on the mounting.

The Applicant submits that such a device is already known in document FR 2 849 617.

According to the operation described hereinabove, the operator directs this tool in such a way that the contact surface of the cap bears against the seal and compresses said seal against the mounting.

However, the reciprocal translation movement generates many vibrations.

In order to resolve this problem, it is provided according to this invention: a grasping handle connected to the main body, and resilient connection elements between the main body and the grasping handle.

Advantageously, these resilient connection elements are configured such as to limit the propagation, in the grasping handle, of the vibrations generated by the reciprocal translation movement.

As such, thanks to this arrangement of technical means, characteristic of this invention, it is possible to reduce the vibrations generated by the reciprocal translation movement of the distal portion relative to the main body.

More particularly, by functionally dissociating the vibration generator from the grasping handle, and by connecting these two elements via suitable resilient means, the vibrations generated by the reciprocal translation movement of the distal portion relative to the main body are reduced.

The Applicant has observed during tests that the presence of these resilient connection elements between the main body and the grasping handle make it possible to filter the low frequencies.

This filtration of low frequencies is made possible by the presence of resilient connection elements that are deformed and that dampen the vibrations.

The operator as such has a practical and ergonomic tool that he grasps in his hand via the grasping handle.

By actuating the tool for placing a seal against a mounting such as for example a vehicle door, he no longer feels the "low frequency" vibrations generated by the reciprocal translation movement.

Advantageously, the resilient connection elements are comprised of at least partially a material of the polyurethane type. The use of the polyurethane makes it possible to significantly reduce the propagation of vibrations in the device.

Advantageously, polyurethane has an average hardness between about 70 to 90 Shore A, preferably substantially equal to 80 Shore A. After several tests, the physical properties hereinabove showed positive results in terms of reducing vibrations in the device.

Advantageously, the resilient connection elements include two plates of substantially annular shape with each one encircling a portion of the main body.

Preferably, each plate comprises a functional portion, called the filtering portion, that has a transverse section that has a surface between about 110 and 140 mm$^2$. It is in particular this filtering portion that is deformed and makes it possible to limit the propagation of vibrations in the grasping handle.

Advantageously, the device according to this invention further comprises a resilient cord of which each end is integrally attached to the grasping handle by means of fastening, and of which the median portion is fastened to the rear of the main body opposite the distal portion in such a way as to force the main body in the direction of the distal portion.

Such a resilient cord positioned as such between the main body and the grasping handle makes it possible, as was revealed by the tests conducted by the Applicant, to filter the high frequencies.

Advantageously, each one of the means for fastening is provided with an adjusting screw in order to adjust the tension of the resilient cord. As such, by loosening this screw, the tension of the cord can be adjusted.

Preferably, the resilient cord is constituted at least partially in a material of the elastomer type.

In an alternative, the resilient cord is formed by a plurality of resilient filaments that each have a diameter between about 0.6 and 1 millimeter, preferably substantially equal to 0.8 millimeter.

Optionally, the plurality of filaments can be surrounded in a protective sheath, more preferably braided.

Advantageously, the cap is removable. It is as such possible to change the cap according to the use that is sought of the device, and in particular according to the size of the seal (its width) that is sought to be carried out. Then, the desired side of the contact surface can be chosen.

In an advantageous embodiment, the main body comprises inside thereof a bore wherein a cylinder mobile, integral with the distal portion, is able to slide in a reciprocal translation movement, with said main body having an opening that opens onto the bore.

In this embodiment, the drive means are configured to drive the cylinder in a reciprocal translation movement inside the main body.

Preferably, in this mode, the cylinder is hollow, and the drive means comprise:
  a piston mobile housed inside the cylinder, and
  a feed tube configured to pass a flow of air through a plurality of perforations arranged on the cylinder and the piston in such a way as to drive the piston in a reciprocal translation movement in the cylinder.

Advantageously, a portion of the feed tube passes inside the grasping handle, which facilitates the handling of the device by an operator.

Preferably, the feed tube is configured for the conveying of a compressed air flow.

Advantageously, the main body is machined in such a way as to have at least one exhaust outlet that allows for the exhausting of the air in order to adjust the pressure inside the main body.

Preferably, the device comprises a sound insulator that covers at least partially said at least one exhaust outlet.

In an embodiment, the sound insulator is comprised at least partially of a polyurethane foam. Preferably, this polyurethane foam has:
  a density between about 30 to 50 kg/m$^2$, preferably substantially equal to 40 kg/m$^2$, and/or
  a thickness substantially equal to 30 millimeters.

Advantageously, the main body is provided with means for guiding that form a slide in order to allow for the relative displacement of the cylinder inside the bore.

Preferably, these means for guiding are comprised at least partially in a material of the polyethylene-terephtalate type, more preferably coated with a solid lubricant.

Correlatively, this invention relates to also the use of a device such as described hereinabove for the placing of a seal on a door of a motor vehicle.

As such, through its various structural and functional aspects, this invention proposes a tool that is easy to use that allows for the placing of a seal without feeling the various disturbances encountered until now with the tools of prior art.

BRIEF DESCRIPTION OF THE ANNEXED FIGURES

Figure 2:
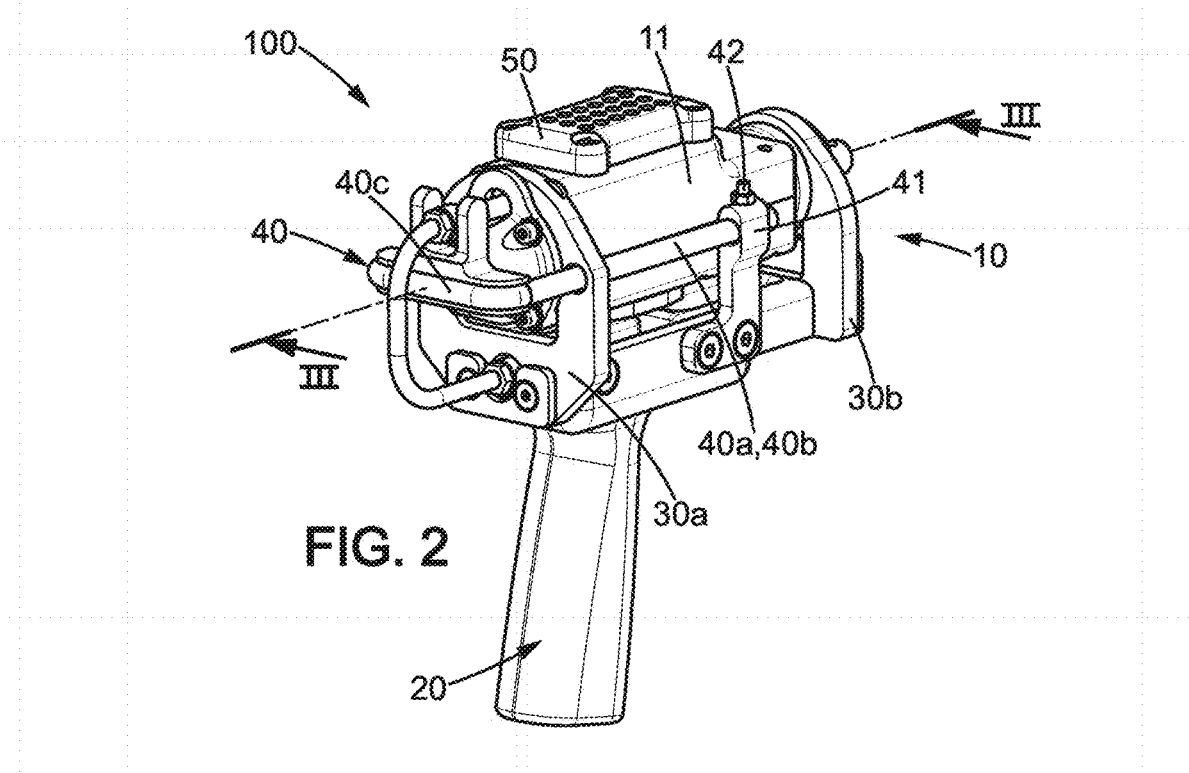
Figure 3:
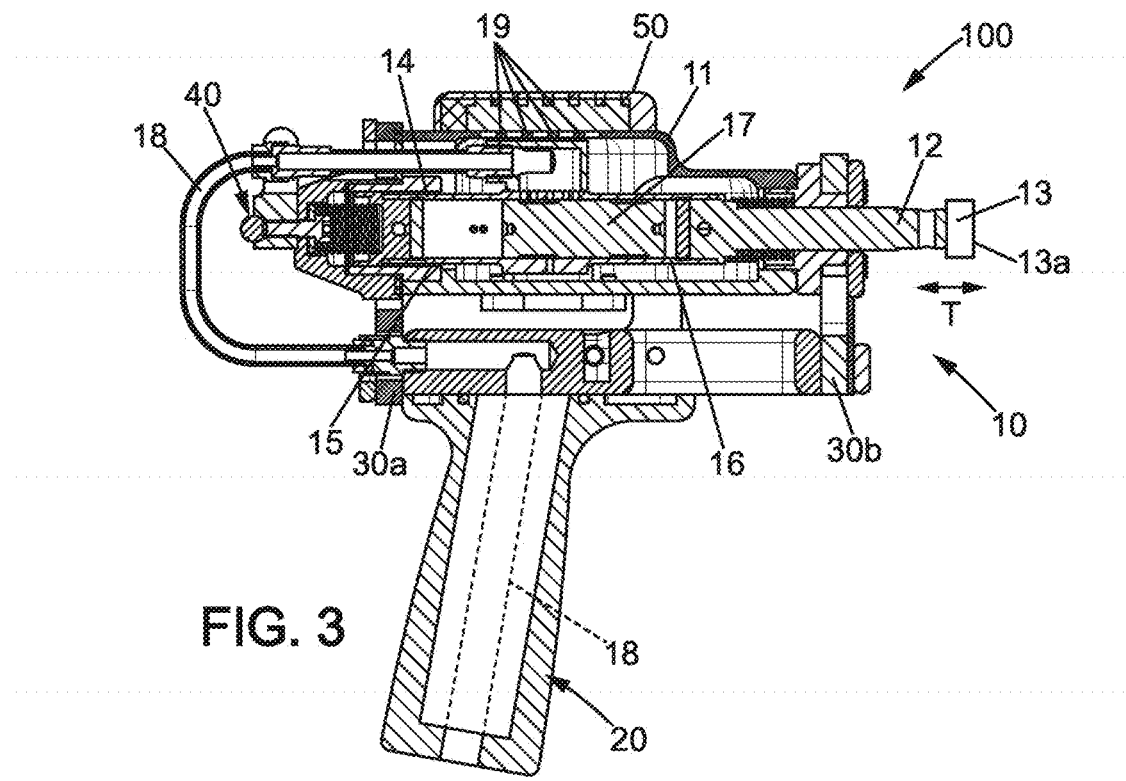
Figure 4:
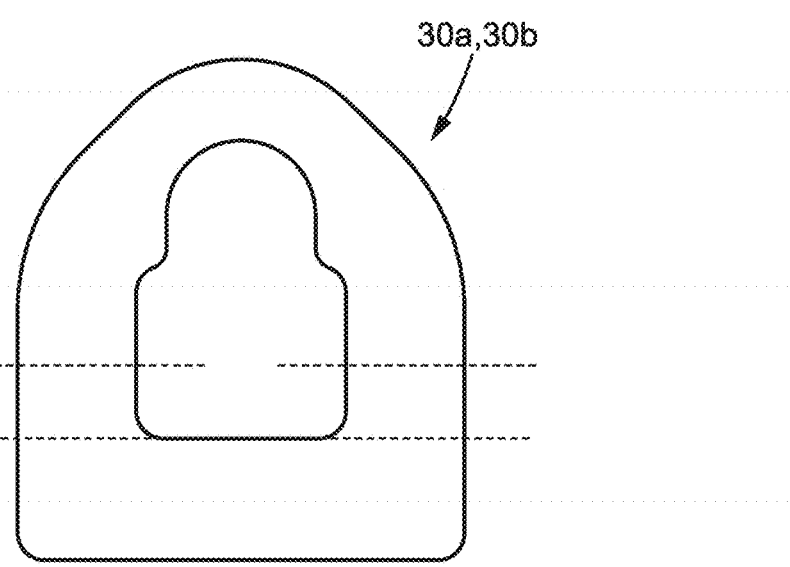

Other characteristics and advantages of this invention shall stem from the description hereinbelow, in reference to the annexed FIGS. 1 to 4 which show an embodiment thereof devoid of any limiting nature and wherein:

FIG. 1 diagrammatically shows a lateral view of a device in accordance with an advantageous embodiment of this invention;

FIG. 2 diagrammatically shows a cross-section lateral view of a device in accordance with FIG. 1; and FIG. 3 diagrammatically shows a rear view in perspective of a device in accordance with an advantageous embodiment of this invention FIG. 4 diagrammatically shows a front view of a resilient connecting element intended to be positioned between the main body and the grasping handle of a device in accordance with an advantageous embodiment of this invention.

DETAILED DESCRIPTION OF AN ADVANTAGEOUS EMBODIMENT

A device for the placing of a seal on a mounting shall now be described in what follows in reference jointly to FIGS. 1 to 4.

The description that follows primarily relates to an embodiment that relates to the field of the automobile industry, and more particularly to the field of assembly lines in the automobile industry whereon operators are in charge of placing a seal on vehicle doors.

Of course, this example of application is an example among others; those skilled in the art will understand here that the device proposed in the scope of this invention can have other advantageous applications in other fields that require the placing of a seal.

In the example described here, the seal J is already "placed" on a mounting S such as a door of a motor vehicle. The operator has to "place" the seal J by pressing this seal J against the mounting S. Such a placing is possible by exerting a pressure on the seal J against the mounting S; in other terms, it is sufficient for this placing to compress the seal J against the mounting S.

Such a placing requires the use of a tool of the type proposed in document FR 2 849 617.

Such a tool, through its pneumatic mechanisms, generates many vibrations which are harmful and violate the various standards and regulations in effect in the automobile industry.

Moreover, such a tool is noisy.

One of the objectives of this invention is therefore to provide here a solution to these problems.

More particularly, this invention aims to provide a device for the placing of a seal, which is easy to handle and which is comfortable to use.

It is in particular sought a device that limits, or even suppresses, the vibrations and the noise that the operator experiences when the latter uses a tool such as the one proposed in document FR 2 849 617.

Limiting these vibrations and this noise is made possible by the arrangement of various means that shall be described in what follows.

In the example described here, and as shown in FIG. 1, the operator has a tool consisting of a device 100 for placing a seal J comprising a vibration generator 10, or motor.

In this example, the vibration generator 10 comprises a main body 11; as shown in FIG. 2, the main body 11 has an opening (preferably oblong) opening onto a bore 15 inside the main body 11.

The vibration generator 10 also comprises a distal portion 12 formed by an axis passing through said opening, and of which the end is provided with a cap 13 having a contact surface 13a for engaging with the seal J.

In this example, the axis is able to carry out a reciprocal translation movement T relative to the main body 11 by sliding through said opening. As such, thanks to this reciprocal movement T, the operator only has to direct the contact surface 13a of the cap 13 in the direction of the seal J. Once it is sufficiently close, the surface 13a via the reciprocal movement engages with the seal J and compresses said seal J against the mounting J for the placing thereof.

This relative displacement of the axis relative to the main body 11 is possible thanks to specific drive means 14.

In this example, these drive means 14 are those disclosed in document FR 2 849 617. Here, these means are therefore pneumatic means; those skilled in the art will understand that other means, for example electrical or hydraulic, can also be deployed in order to drive the putting into movement of the axis relative to the main body 11.

The drive mechanism can be described briefly in what follows:

As shown in FIG. 2, in the bore 15 slides in the reciprocal translation movement a hollow cylinder 16, integral with the distal portion 12. It is understood here that the putting into movement of the cylinder allows the axis to slide through the opening in a reciprocal linear movement.

The cylinder 16 is guided by means for guiding inside the bore 15, with these means for guiding forming a slide being comprised in particular of guiding rings located at the ends of the cylinder and making it possible to guide the cylinder in translation in the bore.

This movement of the cylinder 16 in the bore 15 is possible by the presence of a mobile piston 17 housed inside the cylinder 16, and of a feed tube 18.

In the example described here, the tube 18 allows for the passage of a flow of compressed air inside the cylinder 16.

This compressed air is then guided through a plurality of perforations arranged on the cylinder 16 and the piston 17.

These perforations are specific and are configured in such a way that, when the flow of air circulates through the perforations, the piston 17 is displaced in a reciprocal translation movement in the cylinder 16.

In this example, it is therefore the movement of the piston 17 inside the cylinder 16 that drives the movement of the cylinder in the bore 15.

In this example, it is furthermore provided a plurality of exhaust outlets 19 which are arranged in the body 11 in order to allow for the exhausting of the compressed air in order to adjust the pressure inside said main body 11.

The vibration generator is noisy. In order to limit the noise generated, a sound insulator 50 is provided, made of polyurethane, that covers these exhaust outlets 19.

The drive means 14 described hereinabove generate many vibrations.

In order to make the device 100 easier to handle and dissociate the functions that make it possible to generate vibrations and those for grasping, it is provided in the example described here the presence of a grasping handle 20, independent of the vibration generator 10.

In the example described here, and as shown in FIG. 2, a portion of the feed tube 18 passes inside this grasping handle 20. As such, when the operator uses the device 10 by grasping it via the handle 20, the operator is not hindered by the feed tube 18.

In the example described here, the main body 11 is mounted on the grasping handle 20 by means for guiding forming a slide; this slide makes it possible to authorise the relative displacement of the main body 11 in relation to the grasping handle 20, in particular when the contact surface 13a is pressed against the seal J.

In this example, the presence of resilient connection elements 30a and 30b between the main body 11 and the grasping handle 20 is also provided.

These connecting elements 30a and 30b are configured such as to limit the propagation, in the grasping handle 20, of the vibrations generated by the reciprocal translation movement.

In this example, the connecting elements 30a and 30b are made of polyurethane and have a hardness of 80 Shore A.

As shown in FIG. 3, these connecting elements 30a and 30b are fixed on the upper portion of the grasping handle, on its ends. In this example, these elements 30a and 30b consist of two plates of annular shape with each one encircling a portion of the main body 11.

As shown in FIG. 4, each one of these plates 30a and 30b has, on the filtering portion, a transverse section (31a, 31b) that has a surface between about 110 and 140 mm$^2$. It is this filtering portion that is deformed and provides the filtration of the vibrations.

In the example described here, the device also comprises a resilient cord 40 made of elastomer of which each end 40a and 40b is integrally fixed to the grasping handle 20 by means of fastening 41. In this example, each means 41 comprises an adjusting screw 42 that makes it possible to adjust the tension of the resilient cord 40.

As shown in FIG. 3, the median portion 40c of the cord 40 is fastened to the rear of the main body 11 opposite the distal portion 12.

The presence of such a cordon 40 makes it possible to force the main body 11 in the direction of the distal portion 12.

The operator who is holding in his hand through the intermediary of a handle 20 a device 100 comprising a resilient cord 40 and elements for connecting 30a and 30b feels almost no vibration. Indeed, the joint presence of these elements 40, 30a and 30b makes it possible to filter both the high and the low frequencies that are generated by the motor, vibration generator.

Thanks to the various characteristics described hereinabove, this invention makes it possible to remedy the various disadvantages hereinabove of prior art.

This invention as such proposes a tool that is practical, easy to handle and with low encumbrance, that improves the comfort of the user with respect to a tool with respect to a tool such as the one proposes in document FR 2 849 617.

The tool proposed here in the scope of this invention has an advantageous application for the placing of seals on car doors in the assembly lines of the automobile industry.

It must be observed that this detailed description relates to a particular embodiment of this invention, but that in no way does this description have any limiting nature whatsoever as to the object of the invention; on the contrary indeed, it has for objective to remove any possible imprecision or any incorrect interpretation of the following claims.

The invention claimed is:

1. Device (100) for placing a seal (J) on a mounting (S) comprising:
   a vibration generator (10) comprising:
   a main body (11),
   a distal portion (12), movable relative to said main body (11), onto which a cap (13) having a contact surface (13a) for engaging with the seal (J), and
   drive means (14) configured to drive said distal portion (12) in a reciprocal translation movement (T) relative to the main body (11) for the placing of the seal (J) on the mounting (S), when the surface (13a) of said cap (13) engages with said seal (J) that is placed on the mounting (S),
   a grasping handle (20) connected to the main body (11), and resilient connection elements (30a, 30b) between the main body (11) and the grasping handle (20) configured such as to limit the propagation, in the grasping handle (20), of the vibrations generated by the reciprocal translation movement (T), and
   a resilient cord (40) of which each end (40a, 40b) is integrally fixed to the grasping handle (20) by means for fastening (41), and of which the median portion (40c) is fastened to the rear of the main body (11) opposite the distal portion (12) in such a way as to force the main body (11) in the direction of said distal portion (12).

2. Device (100) according to claim 1, wherein the resilient connection elements (30a, 30b) are comprised at least partially of polyurethane.

3. Device (100) according to claim 2, wherein the polyurethane has an average hardness between 70 to 90 Shore A.

4. Device (100) according to claim 1, wherein the resilient connection elements (30a, 30b) include two plates (30a, 30b) of substantially annular shape with each one encircling a portion of the main body (11).

5. Device (100) according to claim 4, wherein each plate (30a, 30b) comprises a filtering portion that has a transverse section having a surface between 110 and 140 mm$^2$.

6. Device (100) according to claim 1, wherein each one of the means for fastening (41) is provided with an adjusting screw (42) in order to adjust the tension of the resilient cord (40).

7. Device (100) according to claim 1, wherein the elastic cord (40) is constituted of at least partially an elastomer.

8. Device (100) according to claim 1, wherein the resilient cord (40) is formed by a plurality of resilient filaments that each have a diameter between 0.6 and 1 millimeter.

9. Device (100) according to claim 8, wherein said plurality of filaments is surrounded in a protective sheath.

10. Device (100) as claimed in claim 1, wherein the cap (13) is removable.

11. Device (100) as claimed in claim 1, wherein the main body (11) comprises inside thereof a bore (15) wherein a movable cylinder (16), integral with the distal portion (12), is able to slide in a reciprocal translation movement, said main body (11) having an opening that opens onto said bore (15).

12. Device (100) according to claim 11, wherein the cylinder (16) is hollow, and wherein the drive means (14) comprise:
   a piston (17) mobile housed inside said cylinder (16), and
   a feed tube (18) configured to pass a flow of air through a plurality of perforations arranged on the cylinder (16) and the piston (17) in such a way as to drive the piston (17) in a reciprocal translation movement in the cylinder (16).

13. Device (100) according to claim 12, wherein a portion of the feed tube (18) passes inside the grasping handle (20).

14. Device (100) according to claim 12, wherein the main body (11) is machined in such a way as to have at least one exhaust outlet (19) that authorises the exhausting of air in order to adjust the pressure inside said main body (11).

15. Device (100) according to claim 14, comprising a sound insulator (50) that covers at least partially the exhaust outlet (19).

16. Device (100) according to claim 15, wherein the sound insulator (50) is constituted at least partially of a polyurethane foam.

17. Device (100) according to claim 16, wherein the polyurethane foam has:
   a density between 30 to 50 kg/m$^3$, and/or
   a thickness substantially equal to 30 millimeters.

18. Method of placing of a seal (J) on a door of a motor vehicle, which comprises:
   providing a device according to claim 1;
   directing the contact surface 13a of the cap 13 in the direction of the seal; and
   engaging the contact surface with the seal via the reciprocal translation movement to compress the seal against the mounting.

* * * * *